(12) United States Patent
    Emrich

(10) Patent No.: US 10,315,342 B2
(45) Date of Patent: Jun. 11, 2019

(54) PLASTIC MOLDED PART AND METHOD FOR ITS PRODUCTION

(71) Applicant: Elkamet Kunststofftechnik GmbH, Biedenkopf (DE)

(72) Inventor: Marco Emrich, Ulrichstein (DE)

(73) Assignee: ELKAMET KUNSTSTOFFTECHNIK GMBH, Biedenkopf (DE)

( * ) Notice: Subject to any disclaimer, the term of this patent is extended or adjusted under 35 U.S.C. 154(b) by 726 days.

(21) Appl. No.: 14/715,708

(22) Filed: May 19, 2015

(65) Prior Publication Data
    US 2015/0328804 A1    Nov. 19, 2015

(30) Foreign Application Priority Data
    May 19, 2014   (DE) .................. 10 2014 106 998

(51) Int. Cl.
    | | |
    |---|---|
    | *B29C 41/04* | (2006.01) |
    | *B29C 41/20* | (2006.01) |
    | *B29C 41/06* | (2006.01) |
    | *B29K 25/00* | (2006.01) |
    | *B29K 105/00* | (2006.01) |
    | *B29L 31/00* | (2006.01) |
    (Continued)

(52) U.S. Cl.
    CPC .............. *B29C 41/06* (2013.01); *B29C 41/20* (2013.01); *B29C 33/14* (2013.01); *B29K 2025/00* (2013.01); *B29K 2105/08* (2013.01); *B29K 2105/253* (2013.01); *B29K 2995/0068* (2013.01); *B29L 2031/712* (2013.01); *B29L 2031/7172* (2013.01)

(58) Field of Classification Search
    CPC ....... B29L 2031/7172; B29L 2031/712; B29C 41/06; B29C 41/20; B29C 33/14; B29K 2105/08; B29K 2025/00; B29K 2105/253; B29K 2995/0068
    See application file for complete search history.

(56) References Cited

U.S. PATENT DOCUMENTS

| | | |
|---|---|---|
| 3,417,097 A | 12/1968 | Downing et al. |
| 3,610,457 A | 10/1971 | Opalewski |
| | (Continued) | |

FOREIGN PATENT DOCUMENTS

| | | |
|---|---|---|
| DE | 102011009748 A1 | 8/2012 |
| EP | 0030027 A1 | 6/1981 |
| | (Continued) | |

*Primary Examiner* — Robert J Grun
(74) *Attorney, Agent, or Firm* — Leydig, Voit & Mayer, Ltd.

(57) ABSTRACT

A method for the production of a molded part made of plastic by rotational molding includes providing an insert element made of at least one of an absorbent and saturable material in a rotational melt mold. The rotational melt mold has at least one of a constriction and a wall that projects, in an area of an inner radius, into an interior of the rotational melt mold. A plastic precursor of the plastic intended for the plastic molded part is provided in the rotational melt mold. The plastic precursor is present as a melt in the rotational melt mold. The rotational melt mold is rotated so that the melt polymerizes and is simultaneously shaped, so that part of the melt is picked up by the insert element, and so that a wall thickness of the molded part in a finished form is increased in an area where the insert element is arranged.

19 Claims, 7 Drawing Sheets

(51) Int. Cl.
  *B29C 33/14* (2006.01)
  *B29K 105/08* (2006.01)

(56) References Cited

U.S. PATENT DOCUMENTS

| | | |
|---|---|---|
| 4,258,917 A | 3/1981 | Murphy |
| 6,852,788 B2 | 2/2005 | Stevenson et al. |
| 2009/0266823 A1 | 10/2009 | Mazabraud et al. |

FOREIGN PATENT DOCUMENTS

| | | |
|---|---|---|
| GB | 712939 A | 8/1954 |
| WO | WO 9500310 A1 | 1/1995 |

PLASTIC MOLDED PART AND METHOD FOR ITS PRODUCTION

CROSS-REFERENCE TO PRIOR APPLICATION

Priority is claimed to German Patent Application No. DE 10 2014 106 998.6, filed on May 19, 2014, the entire disclosure of which is hereby incorporated by reference herein.

FIELD

The invention relates to a method for the production of a molded part, especially a container, made of plastic by means of rotational molding, whereby a plastic precursor of the plastic intended for the plastic molded part is placed into a rotational melt mold, whereby the plastic precursor is present in the form of a melt in the rotational melt mold and, while the rotational melt mold is rotating, the melt polymerizes and is simultaneously shaped. Moreover, the invention relates to a plastic molded part produced in this manner.

BACKGROUND

Plastic molded parts are used in many areas of application. As hollow bodies, they are used, for instance, in automotive engineering as fuel tanks or as containers for other liquids. Due to their relatively simple shaping, low weight and corrosion-resistance, plastic tanks are a preferred means for storing liquids. They are expected to be mechanically stable, to have a low weight and to meet the increasingly stringent requirements relating to efficient packaging in automotive construction.

Normally, the plastic containers are made by means of rotational molding using a rotational mold. In a commonly used production method, a weighed amount of plastic material in the form of powder, pellets or micropellets or the like is placed into a hollow mold whose inner surface will define the outer surface of the plastic container. The mold is then made to rotate around two axes that are usually perpendicular to each other. Heat is applied to the rotational melt mold. The rotational speeds of the rotational melt molds are slow so that centrifugal forces have little effect as compared to the force of gravity. The plastic material begins to melt and to adhere to the inside of the rotational melt mold, thereby giving the plastic container its ultimate shape. This very widespread variant of the rotational molding method calls for processing temperatures above the melting or softening temperature of the plastic material.

Consequently, some materials, especially thermoplastics having high melting or softening temperatures, or else thermosetting plastics, are preferably processed in a likewise known manner in such a way that a chemical precursor of the material intended for the molded part, the so-called plastic precursor, is placed as a melt in liquid form into the rotational melt mold where, under rotation while simultaneously being shaped, the melt chemically reacts, especially polymerizes, to form the final plastic material. This method is advantageously used, for example, for the production of molded parts made of polyamide 6 (PA6), polyamide 12 (PA12) or their copolymers, whereby the corresponding lactams, that is to say, for instance, caprolactam and/or laurolactam, are used as the plastic precursors that are present in solid form at room temperature under normal conditions, but that are processed by means of the rotational molding method in the form of a melt having a very low viscosity (order of magnitude of 10 mPas, that is to say, approximately the same as that of water). The process temperature is preferably kept below the melting temperature of the finished plastic.

The rotational molding method also makes use of the polymerization reactions of dicyclopentadiene (DCPD) to form poly-dicyclopentadiene (PDCPD, e.g. Telene® made by Rimtec Corp.) or of cyclic butylene terephthalate (e.g. CBT® made by Cyclics Corp.) to form polybutyleneterephthalate (PBT). Moreover, it is a known procedure to produce molded parts made of polyurethanes (PU) by means of the rotational molding method by reacting diisocyanates and/or polyisocyanates with diols and/or polyols as the plastic precursors.

All of the cited material systems have in common the fact that the produced molded part is made of a plastic material that is only formed during the shaping in the rotational mold from a plastic precursor that is initially present in liquid form in the rotational mold.

German patent application DE 10 2011 009 748 A1 discloses a method for the production of a two-layer plastic in which a mixture containing a polyamide precursor compound, at least one activator and a catalyst is placed into a preheated mold. Immediately before the mixture is placed into the preheated mold, the components are mixed and placed into the mold as a preparation. After the first mixture has at least partially polymerized, a second mixture is placed into the mold. After a further polymerization reaction to form another polyamide layer, the mold is cooled off so that the plastic product can be demolded.

U.S. Pat. Appln. No. 2009/0266823 A1 describes a method for the production of a plastic bladder made of polyurethane that is suited as a liner for fiber-reinforced pressurized tanks. The bladder is produced by means of the rotational molding method from a reactive mixture that, as the plastic precursor, contains Gyrothane® 900 or 909 (essentially a polyetherpolyol) and Raigidur® FPG (essentially a diisocyanate).

A fundamental problem recognized by the inventor in the production of containers is that the rotational melt mold only defines the outer contour of the molded part, but not the inner shape. It is true that, during the production, a theoretical mean wall thickness of the molded part can be established by suitably adapting the added amount of material to the size of the inner surface of the mold, but it cannot be guaranteed that the container will acquire a uniform wall thickness. The wall thickness is always subject to a certain variation. Particularly in the area of inner radii, that is to say, in the areas where the wall of the rotational mold projects into the interior of the mold, wall thicknesses are obtained that are, at times, actually considerably less than the mean wall thickness. The smaller this inner radius is, the larger the extent of this reduction in the wall thickness. In turn, material always accumulates in the area of the outer radii, that is to say, for instance, the outer edge of a plastic container, as a result of which the wall thickness in such areas is above the mean wall thickness. As the outer radius decreases, the extent of the greater thickness of the wall increases. Whereas outer radii lead only to an increased wall thickness, the stability of thin-walled spots in the area of inner radii can be considerably impaired, which diminishes the strength and the durability of the molded part.

Special challenges arise in conjunction with complex shapes such as, for example, integrally shaped lugs or the like. Especially in constricted spaces, for example, in the area of the outer walls that run in parallel at a small distance from each other, bridge formation can occur during the course of the polymerization, thus promoting void formation between the walls. The envisaged contour feature is then incompletely shaped.

Particularly before the backdrop of increasing requirements relating to packaging in vehicles, however, it is often necessary to ideally utilize a complex and intricate installation space in the vehicle or machine, thus entailing a complex tank design. Therefore, the inventor recognized that it is desirable to be able to systematically influence the material distribution, even in molded parts with complicated shapes. In this context, it is advantageous if the wall thickness can be locally increased in specific places of the finished plastic container. Increasing the shot weight of the material is a remedy with very limited benefits, since the additionally employed material essentially only leads to a further increase in the wall thickness in the area of the outer radii, while the wall thicknesses in the area of the thin spots are only minimally improved. In the final analysis, this measure does nothing but increase the material consumption and the weight of the part, so that, particularly in the case of containers and tanks, the available useful volume is reduced.

It is a known procedure to influence the wall thickness distribution by suitably selecting the speed, the rotational speed ratio, the temperature course in the mold and by employing other measures. U.S. Pat. No. 3,417,097, for example, describes a process in which caprolactam in liquid form is placed into a rotational mold, the caprolactam adheres to the inner contour of the rotational mold while the mold is being rotated, and the melt polymerizes to form a molded part. In order to improve the uniformity of the wall thickness, it is proposed to divide the amount of material over at least two metering procedures and to employ a predetermined temperature profile and rotation profile.

However, since in the rotational molding method like —with blow molding and in contrast to injection molding— only the outer surface of the molded part is in contact with the mold, the results that can be achieved with a given geometry of the molded part are fundamentally limited. These effects are particularly pronounced during the processing of monomers that are placed into the rotational mold in the form of a low-viscosity melt and that are polymerized under rotation. The more the geometry of the molded part deviates from a spherical shape, the broader the variation of the wall thicknesses.

U.S. Pat. No. 6,852,788 B2 describes a composition comprising carrier and binder components as well as a plastic powder to be used in rotational molding with plastic powders or pellets on the basis of a thermoplastic sintering process. This composition is applied as a molding compound into the areas of the rotational mold in which the wall thickness of the molded part is supposed to be increased, that is to say, for example, in the area of ribs and screw domes. As the carrier and binder component, it is proposed to use, among other things, polyethylene having a very low density, petroleum jelly, hydrocarbon wax and hydrocarbon tackifiers. As an alternative, thermoplastics that have a low melt-flow index and that have been adapted to the base polymer of the molded part can be used.

This method, however, cannot be used when a plastic precursor in the form of a melt is placed into the rotational melt mold and the polymerization of the plastic precursor is carried out and activated below the melt temperature of the finished plastic. Since the process temperatures are kept below the melt temperature of the finished polymer, the polymer material in powder form that was added along with the composition would not sinter with itself or with the material newly created by the polymerization. Moreover, the production of the molding compound is quite laborious.

SUMMARY

In an embodiment, the present invention provides a method for the production of a molded part made of plastic by rotational molding. An insert element made of at least one of an absorbent and saturable material is provided in a rotational melt mold. The rotational melt mold has at least one of a constriction and a wall that projects, in an area of an inner radius, into an interior of the rotational melt mold. A plastic precursor of the plastic intended for the plastic molded part is provided in the rotational melt mold. The plastic precursor is present as a melt in the rotational melt mold. The rotational melt mold is rotated so that the melt polymerizes and is simultaneously shaped, so that part of the melt is picked up by the insert element, and so that a wall thickness of the molded part in a finished form is increased in an area where the insert element is arranged.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
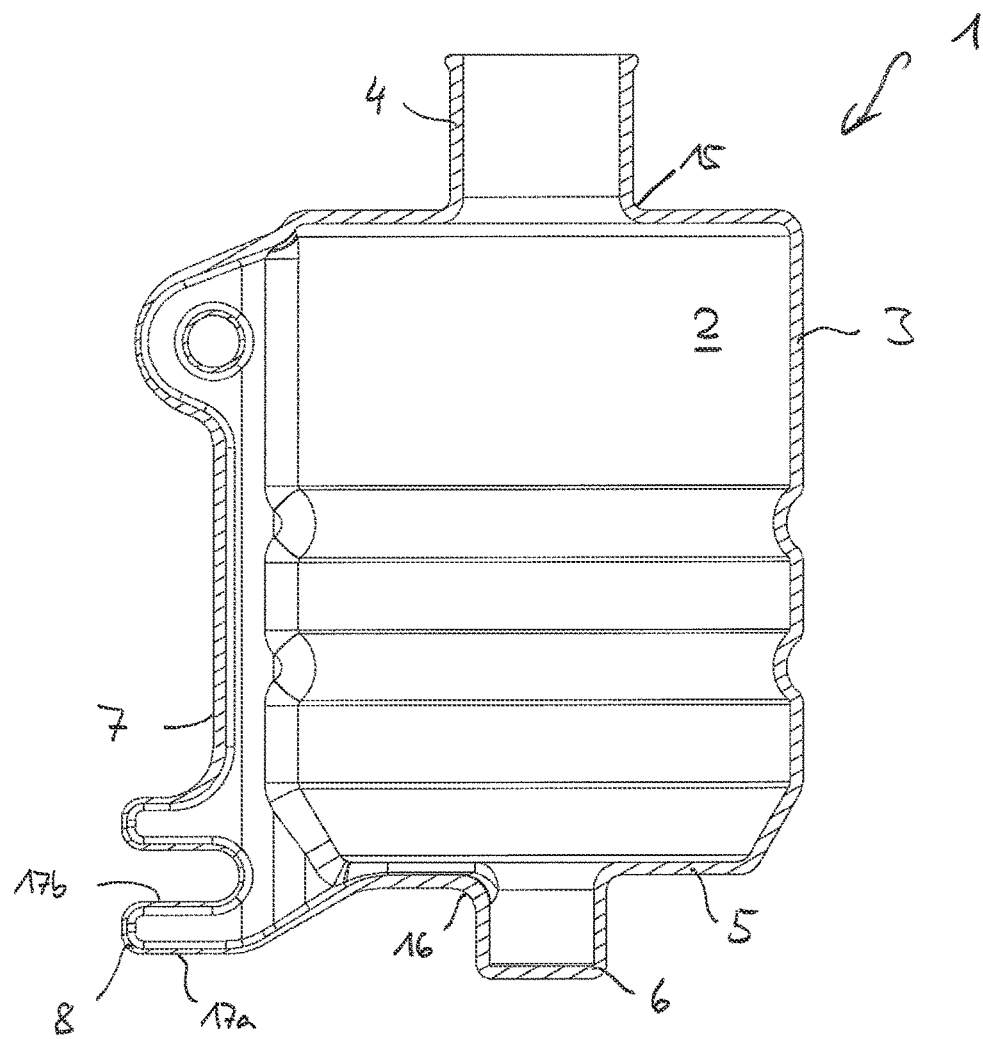
FIG. 1 a plastic container in a sectional view.

In an embodiment, the invention provides a simplified possibility to systematically influence the wall thickness of a plastic molded part, especially one that is produced on the basis of a plastic precursor melt, so that the wall thicknesses of the finished plastic molded part can be systematically increased locally and can be strengthened.

A method according to an embodiment of the invention comprises the following steps:

a) placing an insert element made of an absorbent and/or saturable material into the rotational melt mold;
b) placing the plastic precursor into the rotational melt mold;
c) causing the rotational melt mold to rotate, so that part of the melt is picked up by the insert element.

Preferably, the insert element is put in place and, if necessary, affixed, for example, glued, into the areas of the rotational mold where the wall thickness of the finished plastic molded part is supposed to be increased or where a certain contour feature is to be shaped on to the future molded part.

The rotational melt mold can already be preheated for the process.

The plastic precursor can be placed into the mold, for example, in the form of a liquid having a moderate viscosity. In this case, it is provided that the plastic precursor in the form of a liquid melt is placed into the rotational melt mold. However, it can also be added in solid form (e.g. as a powder, pellets, flakes or the like) and only melted once it is in the mold, so that part of the melt that is formed is picked up by the insert element. In both cases, the possibility exists to apply heat to the rotational melt mold in step c). In general, however, it proves to be advantageous to carry out step c) at a process temperature at which the plastic precursor is present in liquid form. The insert element is then completely saturated with the melted plastic precursor when the rotational melt mold is rotating, preferably biaxially. Owing to the fact that the insert element holds the melt in a clearly defined position, the build-up of the wall thickness is enhanced in the area of the rotational mold that is fitted with the insert element, since in this area, the absorption and saturation effect brings about a greater accumulation of material as compared to other areas of the mold.

Heating up the rotational melt mold during the process, however, is not absolutely necessary. Suitable material systems such as, for example, polyurethanes (PU), can also be processed at room temperature. The plastic precursor then merely has to be placed into the rotational melt mold in liquid form as a melt, where it polymerizes during the subsequent rotation of the melting mold.

The production of the molded part in the rotational melt mold is carried out under slight pressure at the most, typically at a pressure of less than 2000 mbar. Preferably, the rotational melt mold, however, is vented, so that the process takes place essentially pressure-free, that is to say, at atmospheric pressure (e.g. 1013 mbar).

Particularly in production processes in which the plastic precursor is placed into the rotational melt mold in the form of a melt, that is to say, in liquid form, the use of the absorbent and/or saturable material has proven to be advantageous since the rotation of the rotational melt mold directly causes the melt to penetrate the insert element. Preferably, the melt is a low-viscosity melt, especially a monomer melt, since it exhibits an elevated absorption and saturation effect. Polyamide 6 (PA6), polyamide 12 (PA12) or their copolymers are used as preferred materials for the production of the plastic molded parts according to the invention. In this case, as the monomer starting material, the corresponding lactams such as, for example, caprolactam and/or laurolactam are used as the plastic precursors.

Other suitable materials for the production of the plastic molded parts according to the invention are polydicyclopentadiene (DCPD) and polybutylene terephthalate (PBT). In these cases, as the monomeric or oligomeric starting material, it is preferable to use dicyclopentadiene (DCPD; e.g. Telene® made by Rimtec Corp.) or cyclic oligobutylene terephthalate (e.g. CBT® made by Cyclics Corp.) with the corresponding catalysts or additives as the plastic precursor. Other options are polyurethanes (PU) for whose production mixtures of diisocyanates and/or polyisocyanates and diols and/or polyols are used as the plastic precursor. One or both of these precursor components can also be oligomers or prepolymers, that is to say, polymers having a relatively low molecular weight.

Plastic precursors as set forth in the present invention are generally monomers, oligomers, prepolymers and the like, including mixtures of two or more substances from these categories. The plastic precursors according to the invention are present in the form of a liquid melt in the rotational melt mold and, if applicable, they react under the influence of catalysts, activators or other additives that are likewise added, thereby forming a plastic. The reaction can be a radical, cationic or anionic polymerization, polyaddition, polycondensation, metathesis polymerization or the like. The plastic obtained can be a thermoplastic or a thermosetting plastic.

It has been found by the inventor that, in rotational molding on the basis of low-viscosity melts of plastic precursors, the systematic use of an absorbent and/or saturable material yields a sharply delineated and stable local increase in the wall thickness in the appertaining areas of the rotational mold where the insert element is arranged. The insert element picks up the liquid melt in itself by absorbing the melt and/or by being completely saturated with it. The absorbent and/or saturable material is especially well-suited for methods in which the plastic precursor in the form of a melt has a low initial viscosity. Preferably, the polymerization of the plastic precursor is carried out below the melting temperature of the finished plastic. The prepared melt can be placed into the rotational melt mold, for example, by means of a preferably heatable injection device.

Fundamentally, one or more insert elements can be used for the production of a plastic molded part and can effectively reinforce the relevant places.

In addition to systematically increasing the wall thickness and/or improving the shaping of certain contour features, the absorbent and/or saturable material can also fulfill other functions. Thus, at the same time, it can serve to reinforce specific areas of the finished molded part. For this purpose, the absorbent and/or saturable material can be selected, for instance, from among glass fibers, carbon fibers, suitable synthetic fibers or preforms containing such fibers or such materials. By the same token, the insert element can have reinforcement elements in the form of insert parts such as, for example, a tube element, a support ring or the like, or it can affix them in the rotational mold, thereby even further improving the stability of the appertaining places in the finished plastic molded part. Preferably, these reinforcement elements become at least partially embedded into the plastic by means of the polymerization.

Through the use of the insert element, many problems that occur during the production of three-dimensional molded parts having complex shapes can be efficiently solved. Below, an explanation will be given as to what the terms "simple" and "complex" mean within the scope of this invention when relating to the shape of plastic molded parts, especially containers. In this context, aside from rotational molding methods according to the invention, the explanation will also include centrifugal methods, although the latter are not the subject matter of the present invention.

In the rotational molding methods according to the invention, the rotational speeds are so low that the force of gravity dominates over centrifugal forces so that until the material has been completely distributed over the inner wall of the mold there is always a pool of material at the lowest point of the mold. In contrast to this, centrifugal methods make use of such high rotational speeds that centrifugal forces prevail over the force of gravity.

Starting with three-dimensional hollow bodies that are produced by means of the rotational molding method under rotation around two axes that are usually perpendicular to each other, the simplest conceivable geometry of a molded part is that of a sphere. This has to do with the fact that any axis through the mid-point of a sphere is an axis of symmetry, whereby a rotation of the sphere by any angle around the axis of symmetry maps the sphere onto itself. To put it in other words, for each axis through the mid-point of the sphere (axis of symmetry), there is an infinite number of planes of symmetry through the axis of symmetry under consideration, whereby a mirroring on the plane of symmetry maps the sphere onto itself. Consequently, a sphere has full rotational symmetry relative to each axis through the mid-point of the sphere (axis of symmetry).

Therefore, in order to produce a plastic molded part in the form of a spherical hollow body by means of the rotational molding method, the rotational melt mold is preferably arranged on the rotation machine in such a way that both axes of rotation intersect in the mid-point of the spherical interior of the mold, typically at a right angle to each other. The axes of rotation are thus collinear to axes of symmetry of the sphere.

Under such conditions, molded parts with very uniform wall thicknesses can be produced at very high rotational speeds (that is to say, by means of the biaxial centrifugal method). Each spherical shell that is concentric to the interior of the mold is an equipotential surface in the centrifugal field. A material that is present in the interior of the mold, for example, a flowable plastic precursor melt, is flung against the inner wall of the mold, and it adheres very uniformly there. The resultant molded part is characterized by very narrow tolerances in the wall thickness.

In the biaxial rotational molding method as well, that is to say at low rotational speeds at which centrifugal forces hardly play a role, spherical molded parts can be produced with a very good distribution of the wall thickness when the parameters are suitably selected. In this context, especially the rotational speeds around the two axes of rotation as well as the rotational speed ratio are of central importance.

Completely analogously to the spherical shape in the case of closed hollow bodies, a uniaxial centrifugal or rotational molding method makes it very easy to produce tubes that are open at the ends and that have cross sections that are round and constant over the entire length. In this case, the cylindrical mold is arranged in such a way that the axis of rotation is oriented horizontally and, at the same time, collinear to the axis of symmetry (in this case, the only one).

Within the scope of this invention, the spherical shape constitutes a simple geometry of a hollow body. The complexity increases as the shape deviates more from the spherical shape. If one considers, for example, a hollow body in the form of a cylinder with, for instance, semi-spherical end caps, then only one axis of symmetry exists here. However, the rotational symmetry around a second axis that intersects the only axis of symmetry at a right angle and in the mid-point of the hollow body is already considerably disrupted. In this example, this second axis constitutes only a two-fold axis, that is to say, the hollow body is only mapped onto itself in case of a rotation by a multiple of 360°/2.

In such a situation, in the case of the biaxial centrifugal method, no molded part with a uniform wall thickness can be achieved since, at least with identical rotational speeds around both axes, the equipotential surfaces in the centrifugal field also constitute spherical shells here, and consequently, since the mold is not spherical, they no longer run circumferentially at a constant distance from the inner wall of the mold. In case of a cylinder with a length 1 and a diameter d and 1>d or even 1>>d, it is immediately clear that, at a high and uniform speed of rotation around the lengthwise axis (collinear to the axis of symmetry) and around the short axis (collinear to the two-fold axis), a flowable material would accumulate practically entirely at the ends of the elongated cylindrical shape, while practically no wall thickness would build up in the remaining area.

In the biaxial rotational molding method as well, that is to say, at low rotational speeds, in the case of an elongated cylinder, a wall thickness distribution is obtained that is worse than that of a spherical shape due to the geometry involved. This can be understood clearly when one realizes that, at low rotational speeds, there is always a pool of material at the lowest point of the mold. Depending on the distance from the intersection point of the axes of rotation, different points on the inner surface of the mold move at a different speed through this minimum position. For each pass through the minimum position, the time spent in this position is thus different for various points on the surface of the cylinder. Moreover, with such a geometry, it is vastly more difficult than with a sphere to select rotational speeds and rotational speed ratios in such a way that all of the points on the surface of the cylinder pass through the minimum position approximately the same number of times during the course of the production cycle. Both effects together result in a wall thickness uniformity that is far worse than that of the spherical shape.

For n-fold axes, it generally holds true that an object, when rotated by a multiple of 360°/n, is mapped onto itself, whereby n is a positive whole number. Objects with n-fold axes, when n≥2, still have a certain limited or disrupted rotational symmetry, but no longer a full rotational symmetry. Full rotational symmetry means the same as the presence of an ∞-fold axis. When n=1, an object is only mapped onto itself in case of a rotation by a multiple of 360°. Thus, the complexity of a molded part increases as the value of n decreases.

Therefore, shapes that are not rotationally symmetrical have a complexity as compared to rotationally symmetrical objects that makes them difficult to produce since they promote an uneven distribution of the plastic material. Thanks to the systematic placement of the insert element, the local build-up of the wall thickness can be systematically promoted, especially at places that would otherwise have thin walls.

Aside from the aspect of rotational symmetry considered above, additional shape features can be present that stand in the way of a uniform wall thickness formation by means of the biaxial rotational method. These include especially constrictions and inner radii or inner edges.

In the area of constrictions, adjacent wall sections must not be too close to each other, since otherwise void formation and/or incomplete shaping can occur. For example, such constrictions can arise in the area of outer radii in that adjacent sections of the molded part, for instance, wall sections of a container, run at an acute angle towards each other or adjoin each other. In this process, a section that tapers or becomes increasingly narrow towards the boundary area is formed in the boundary area of the wall section, similar to a corner inside a container. In the transition area between the wall sections, the molded part and/or the rotational melt mold or the inner surface of the part in question has a concave shape and forms an outer radius that has a curvature facing the outside, relative to the interior of the molded part or of the rotational melt mold. In the finished part, this section forms an outer edge on the outside. The smaller the angle between the adjacent wall sections is, the larger the radius in the corner area has to be in order to prevent void formation. In the state of the art, at angles of 30° to 60°, a radius in the magnitude of at least R15 generally has to be taken into account. The unit of measurement for the radius R is [mm], whereby R15 means that this refers to a radius with a nominal dimension of 15 mm. A curvature is indicated in this manner. Particularly for the above-mentioned application cases, the systematic placement of the insert element proves to be ideal in order to achieve such critical and complex shapes. Thanks to the insert element, the values for the angle and the radius can even fall below the above-mentioned values.

Constrictions in molded parts also arise because adjacent molded part sections or surface sections of the rotational melt mold run close to each other. For example, the wall of the molded part or of the rotational melt mold can have a section that projects outwards (in other words, not into the interior of the rotational melt mold). In this section, wall sections of the molded part or of the rotational melt mold can run in such a way that they approach each other and/or run parallel to each other. Such sections form an indentation and/or a depression and/or a passage on the interior of the molded part or of the rotational melt mold.

The constriction in the molded part can especially end in a blind hole or the like. It can also be caused by ribs or domes formed so as to face outwards. The rotational melt mold has an inner contour corresponding to the constriction, for example, an indentation like a blind hole or some other inner contour that runs towards the outside of the mold with small or diminishing distances of the mold walls or sections of a mold wall from each other. In the realm of molded part production by means of the rotational molding method according to the state of the art, it is known that parallel or virtually parallel walls in the mold should be at least at a distance that has to be at least 4 times, preferably 5 times, the nominal wall thickness of the molded part in order to rule out the problems described above. An insert element placed into such a constriction ensures that the critical area will have a sufficient wall thickness after the rotational melting process. Furthermore, the distance between the mold walls can be reduced, for example, down to the range of the nominal wall thickness of the molded part. Thus, for example, well-shaped single-wall lugs or the like can be shaped onto a hollow body.

Particularly the formation of fastening lugs or other shapes that form contours that extend outwards on the finished molded part is improved by the systematic use of an insert element in a depression, in a trough, in a tapering or in an indentation in the inner surface of the rotational melt mold. In order to prevent the formation of voids, it is known that fastening lugs have to be structurally dimensioned for a specific wall thickness so as to ensure flawless filling of the lugs with the material. Here, the systematic use of the insert element to increase the wall thickness significantly improves the result of the production process and can contribute to making fastening lugs with a high strength. For this purpose, the insert element is systematically placed into the appertaining area in the rotational melt mold, where it guarantees flawless filling of the area with material. Moreover, the lug can be designed to be altogether thinner or more slender, all the while retaining its strength.

The formation of inner radii on rotational-molded parts is also often critical. These radii are characterized by a curvature of the surface facing the interior of the molded part and/or of the rotational melt mold and/or by an inner edge that projects into the interior of the molded part and/or of the rotational melt mold. They are characterized by a shape of the wall or surface of the molded part and/or of the rotational melt mold that is convex relative to the interior of the molded part or of the rotational melt mold. Such shapes occur, for example, in a blind hole boundary area, in stepped sections such as a reinforcement rib curved outwards, or on elevations such as, for example, free-standing walls facing inwards, for example, baffles. In the case of containers, for example, spouts for attaching hoses can be shaped directly onto the container, whereby an edge or curvature facing inwards is created in the transition area from the spout to the rest of the wall of the container, and this is where the wall thickness of the molded part is reduced because of the contour of the mold. In this case, there is a fundamental risk of thin spots in the wall of the molded part. Therefore, the minimal inner radius that can be achieved in actual practice is limited, and it is common practice, for example, in the case of surfaces of the molded part arranged perpendicular to each other, not to fall below a radius of R10 (radius with a nominal dimension of 10 mm) in the boundary area so that a sufficient wall thickness is still formed in such areas of the molded part. By placing the insert element in the area of edges or curvatures facing inwards, an optimal accumulation of the plastic is achieved. The insert elements can serve to effectively reinforce inner radii, or else to effectively attain smaller inner radii of, for example, less than R10, in that the insert element is systematically placed in the area of inner radii.

Irrespective of this, any other areas of the molded part wall can also be systematically reinforced, for example, in the area of flange connectors and/or insert parts such as nuts or other inserts. It is essential to the invention that the insert elements are only placed in one or more areas of the rotational melt mold so that the wall thickness of the plastic molded part is locally and systematically increased in these areas. Each of these areas is smaller than the total inner surface of the mold, and also together, these areas comprise only a partial area or a partial surface of the mold, which is smaller than the total inner surface of the mold. Therefore, there is no essentially full-surface lining of the mold with one or more insert elements. Advantageously, less than 80% of the inner surface of the mold is provided with one or more insert elements, preferably less than 60%, especially preferably less than 40%, particularly preferably less than 30%.

The term "increase in the wall thickness" means that the appertaining area of the molded part has a greater wall thickness than it would without the use of the insert element. Therefore, the wall thickness of the appertaining area increases relative to the mean wall thickness of the molded part. The latter does not necessarily mean that the wall thickness in the appertaining area is absolutely greater than the mean wall thickness. It can mean, for instance, that, in the case of a molded part with a nominal wall thickness of 5 mm, when the production is carried out according to the state of the art, a certain area has a wall thickness of only 1 mm, which, thanks to the use of an insert element, increases to 3 mm.

The nominal wall thickness $d_N$ (mean wall thickness) of the plastic molded part results from the inner surface A of the rotational melt mold and from the mass m as well as from the density $\rho$ of the plastic material in the processed state, in a close approximation according to $d_N = m \cdot A^{-1} \cdot \rho^{-1}$. In systems in which the reaction of the plastic precursor to form the later plastic does not release and give off any by-products, the mass m of the plastic material is identical to the mass of the added plastic precursor.

Possible absorbent and/or saturable materials for the insert element can include textiles and/or a textile composition. In particular, woven fabrics, non-wovens, knits, bonded fiber fabrics and the like are suitable for this purpose. Since these textiles can be deformed, they can be positioned even in areas or inner contour sections of the rotational melt mold that are difficult to access. Therefore, these materials are especially well-suited for shaping a lug of a plastic container. In the case of flat materials, the absorbent and/or saturable material can be folded or rolled up regularly or irregularly and can be stuffed into the intended area of the mold without a separate fixation means or else, if so desired, it can be affixed there with suitable fixation means such as, for example, an adhesive or the like.

According to another embodiment, the insert element comprises or consists of a preferably open-cell foam and/or a sponge. In this case, the absorbent and/or saturable material can be optimally adapted to the contour area of the mold in which it is to be placed. Thus, the insert element can have, for example, an annular or tubular shape and can thus be used in the area of the spout of a container. Since this area is often exposed to loads, local material reinforcements have proven to be advantageous here. The adaptation of the insert element to the inner contour of the rotational melt mold can be ensured by various measures. The insert element can be produced, for example, by a casting process, by an injection molding process or by mechanically machining it from semi-finished products. It is also possible to spray or cast the insert element directly into the rotational melt mold, especially as an open-cell spray foam or casting foam, that is applied and shaped and/or cured in situ (directly on site).

It has been discovered by the inventor that it is advantageous for the insert element to be configured in such a way that it dissolves during the polymerization of the plastic precursor, as a result of which it can no longer be easily recognized in the finished molded part. Over the course of the production process, the insert element can dissolve in the reaction mixture of the plastic precursor with which it is saturated. The kinetics of the polymerization—on which the viscosity course over time depends—and the dissolution speed can be coordinated with each other in such a way that the absorbent and/or saturable material only dissolves once the viscosity of the reaction mixture is sufficiently high, so that the reaction mixture remains in the area of the mold and cannot flow out of it again.

According to another embodiment, the insert element is not only embedded in the plastic material over the course of the polymerization, but is also chemically bonded to it.

In order to improve the absorption of the melt in the insert element, according to another embodiment, it is provided that the rotation of the rotational melt mold is interrupted in at least one axis of rotation, at least at times. If the rotation of the rotational mold is halted, at least in one axis, in a controlled manner at suitable times during the course of the process, the melt can come to a standstill in the area of the insert element and can penetrate the insert element more effectively. According to another advantageous embodiment, the rotation of the rotational melt mold can be interrupted in such a way that the insert element comes to lie at the lowest point of the rotational melt mold and/or below the level of the liquid melt. This measure can be carried out at least once or, if applicable, for various areas where insert elements are arranged, and/or it can be repeated for one and the same area of the mold. The point in time, frequency and duration of these rotation interruptions as well as the mold position during the standstill can be selected in such a way that the desired result can be achieved.

Another embodiment of the invention provides that, in a further step d), the rotational melt mold is stopped, filled with another plastic precursor or another plastic material, and once again made to rotate so that a second inner plastic layer is formed. The additional plastic precursor can be placed into the rotational mold after the reaction of the first plastic precursor has ended or else has at least progressed to such an extent that the first layer is sufficiently stable when the rotation is interrupted. In this manner, plastic containers having multi-layered wall structures can be produced with the optimal wall thickness. Depending on the material employed, heat can be applied to the rotational melt mold in order to polymerize the additional plastic precursor. The temperature reached during the production of the first layer, in conjunction with the heat of reaction of a second polymerization, however, is often already sufficient. For this reason, with material systems whose polymerization takes place exothermally such as, for example, caprolactam, it is also possible to dispense with the application of heat.

The liquid container 1 shown in FIG. 1 as an example of a plastic molded part according to the invention has a cavity 2 that is defined by the side walls 3 of the liquid container 1. In the upper area of the liquid container 1, a filling neck 4 through which the liquid container 1 can be filled is formed in one piece with the side walls 3 of the liquid container 1. In the bottom area 5 of the liquid container 1, there is a connector or dome 6 that projects outwards. Such a connector can serve, for instance, to support or to anchor the liquid container 1. Consequently, the connector 6 has to be sufficiently strong. A lug 8 is shaped onto the side outer wall 7 of the liquid container 1, and, starting from the interior 2 of the liquid container 1, this lug 8 narrows sharply.

Figure 2:
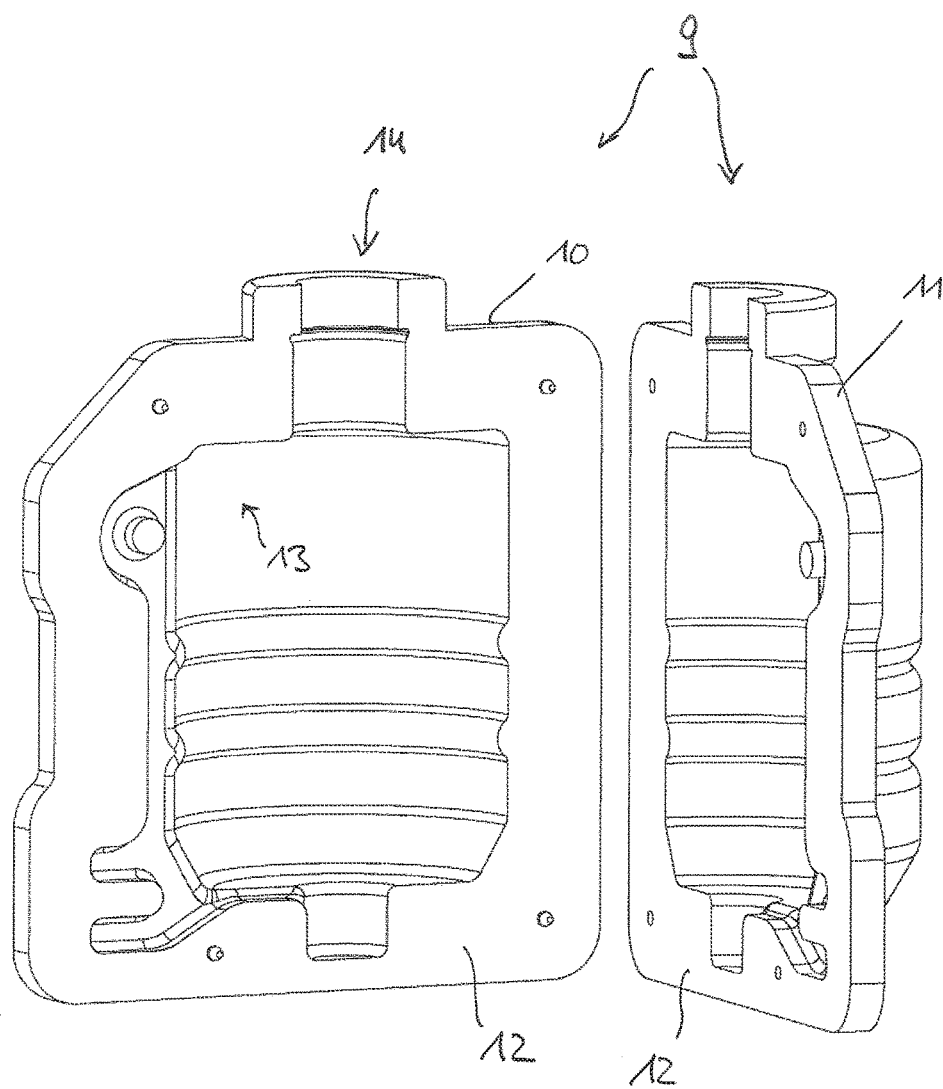
FIG. 2 a perspective view of an opened rotational melt mold.

A rotational mold or a rotational melt mold 9 of the type shown in FIG. 2 is used to produce the liquid container 1 of FIG. 1. It consists of two halves or mold shells 10, 11, whose edges or flanges 12 are laid against each other in order to close it. The interior of the mold shells has a contour 13 that defines the outer shape of the liquid container 1 of FIG. 1 when the shells 10, 11 are laid against each other. In order to produce the plastic container, the rotational melt mold 9 is heated up. In the closed state, it is then filled through a filling opening 14 with the chemical precursor of the material intended for the molded part in the form of a monomer melt having a low viscosity, and it is made to rotate biaxially around the X-axis and the Y-axis. Over the course of the polymerization, the monomer melt forms the final plastic of the plastic container. During this process, the temperature in the rotational melt mold 9 is kept below the melting temperature of the finished polymer. During the rotation, the melt adheres to the contour 13, where it polymerizes. Under continued rotation, the rotational melt mold is cooled off, opened, and the molded liquid container is removed.

Particularly in areas with a small inner radius, like in the transition area 15 (FIG. 1) between the filling neck 4 and the side wall 3 or in the transition area 16 between the bottom area 5 and the connector 6, the problem arises that these sections only have a small wall thickness. Another problematic aspect involves the section around the lug 8, which has quite a complex shape and has two parallel walls 17*a*, 17*b* that run at a small distance from each other.

Figure 3:
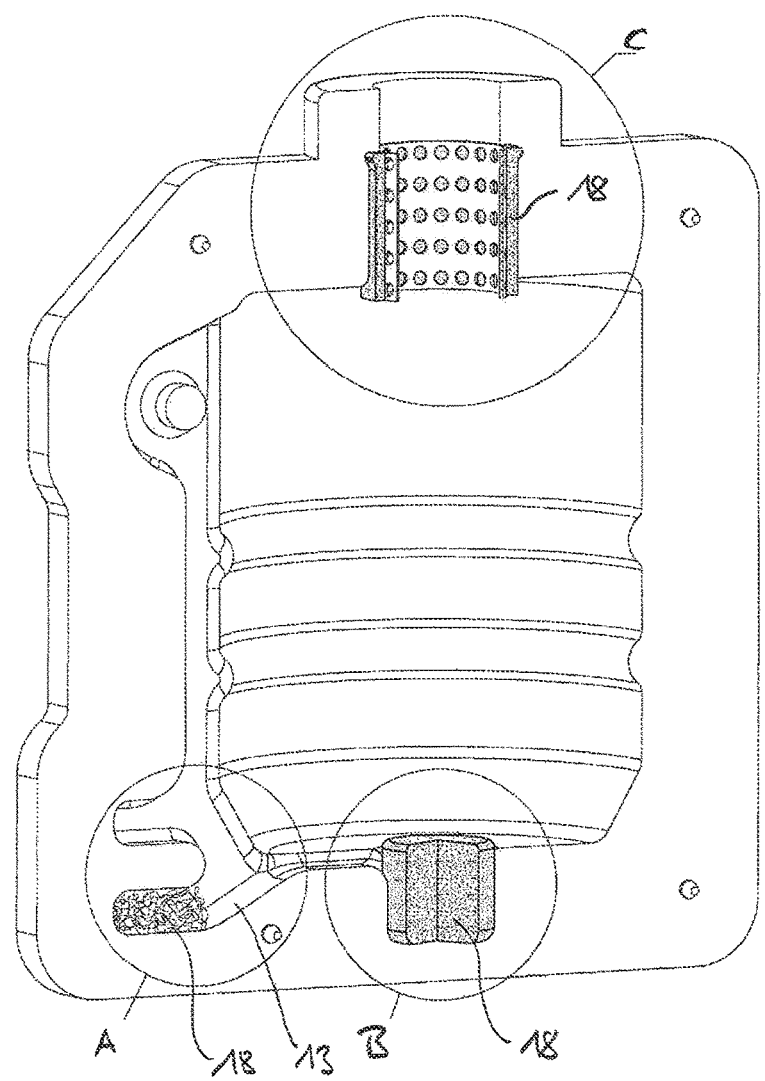
FIG. 3 a perspective view of an opened rotational melt mold into which insert elements according to three embodiments of the invention have been placed.

As shown in FIG. 3, before the rotational melt mold 9 is filled with the melt, each of the critical areas A (lug), B (dome, connector), and C (filling neck) is provided with an insert element 18 that is attached to the appropriate contours 13 of the mold shells 10, 11. This can be seen in FIG. 3, which shows the first mold shell 10.

The insert elements 18 each consist of an absorbent and/or saturable material that is capable of picking up or binding the melt and retaining it. As a result, a local material accumulation occurs in areas A, B and C, thereby ensuring that more material is retained and fully polymerized in these critical areas. The wall thicknesses can be systematically controlled by using the insert element 18.

Figure 4:
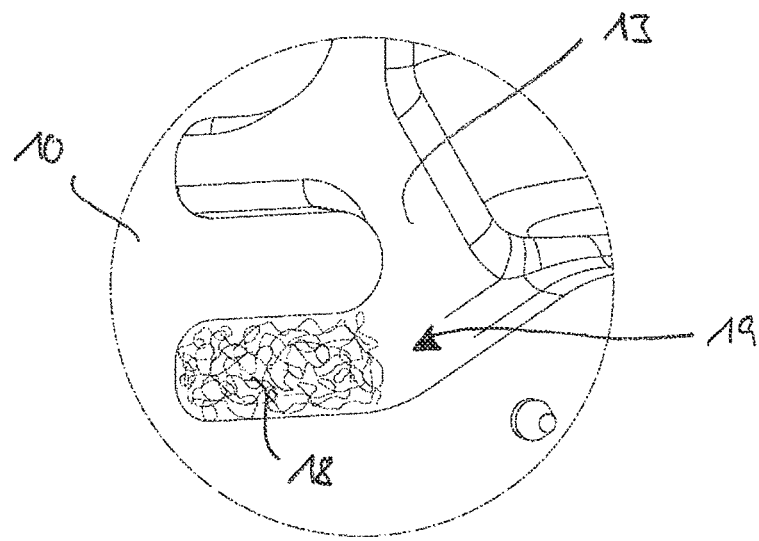
FIG. 4 the insert element in Section A of FIG. 3.

In area A (FIG. 4), the contour 13 of the lug of a liquid container is formed in the mold shell 10. When the rotational melt mold is closed, a constricted section is formed in the direction of the arrow 19. If bridge formation—which closes the constricted section—occurs too early during the polymerization, then the shaping will be incomplete. An insert element 18 made of a textile such as a non-woven, a woven fabric, a knit or the like is stuffed into the constricted section 19. The flexibility of this material ensures that even complicated shapes can be accessed by the insert element.

Figure 5:
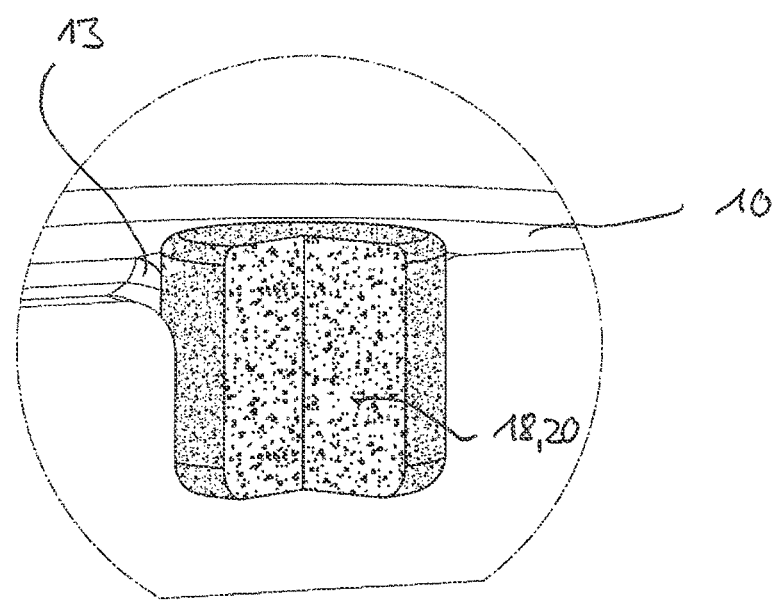
FIG. 5 the insert element in Section B of FIG. 3.

In area B (FIG. 5), a voluminous insert element 18 in the form of a plug 20 has been placed into the contour 13 of the mold shell 10 that is going to form the connector of a liquid container. This insert element can be, for example, an open-cell foam or a sponge. Since the plug 20 is completely saturated with the melt, a considerable accumulation of shaped plastic occurs over the course of the polymerization, and the plastic container has a considerable wall thickness and strength in this area.

In area C (FIG. 6), an insert element 18 in the form of a ring 21 is placed into the contour 13 of the mold shell 10 that is supposed to shape the filling neck of a liquid container, and this insert element rests against the contour 13. A grid-like tube element 22 is in contact with the inside of the ring 21. During the rotational molding, the tube element 22 is embedded in the polymerized plastic and integrally anchored in the wall of the plastic container. The ring 21 likewise consists of an absorbent and/or saturable material, preferably of an open-cell foam, that brings about an increase in the wall thickness in the area of the filling neck.

Figure 6:
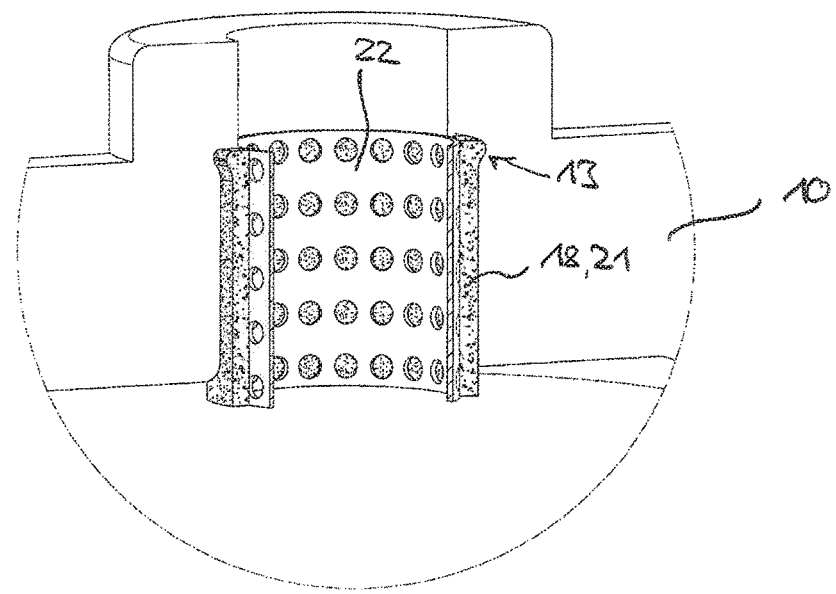
FIG. 6 the insert element in Section C of FIG. 3.

As shown in FIG. 6, the insert elements 18 can be effectively used to anchor insert elements, such as the tube element 22, in the container wall so that they are more effectively melted into the container wall, thereby markedly reducing the risk of leakage with such components.

EXAMPLE (A)

According to a preferred embodiment for the production of a fuel tank, pre-mixes of ε-caprolactam with 0.6% by weight of sodium caprolactamate as the catalyst and of ε-caprolactam with 0.9% by weight of hexamethylene-1,6-bis-carbamido-caprolactam as the activator are melted in two separate vessels and kept at a temperature of 100° C. [212° F.]. The vessels with the two pre-mixes are connected by means of lines with a mixing head from which another line branches off that is fitted with an injection device at its end. The mixing head, the lines between the vessels containing the pre-mixes and the mixing head as well as the line from the mixing head to the injection device can all be heated and are kept at a temperature of 100° C. [212° F.].

In the area of a fastening lug of the future motorcycle tank, a rotational mold, which can have the shape of a fuel tank of a motorcycle, is provided with an absorbent and/or saturable material in the form of a fabric made of polyamide 6.6 in that the fabric is first rolled up and then stuffed into the part of the mold that is responsible for the shaping of the fastening lug. The rotational mold is provided with a venting device that keeps the pressure in the mold at atmospheric pressure. The rotational mold is preheated in an oven at 160° C. [320° F.]. The two pre-mixes are combined in equal parts by weight in the mixing head so as to form a reaction mixture and they are thoroughly mixed, and a first portion (2200 g) of the reaction mixture is fed into the rotational mold within 20 seconds. The rotational mold is slowly rotated biaxially in an oven that is kept at a temperature of 205° C. [401° F.], so that the reaction mixture comes into contact with every part of the inner surface of the mold and adheres to the inner surface. After 200 seconds, the rotation is interrupted so that a second portion (2200 g) of the reaction mixture can be fed in. Subsequently, while being further heated, the mold is slowly rotated biaxially for 180 seconds before it is cooled off to 70° C. [158° F.] in a cooling chamber while still being rotated. The rotational mold is opened, and the molded part in the form of a motorcycle tank is removed.

Figure 7:
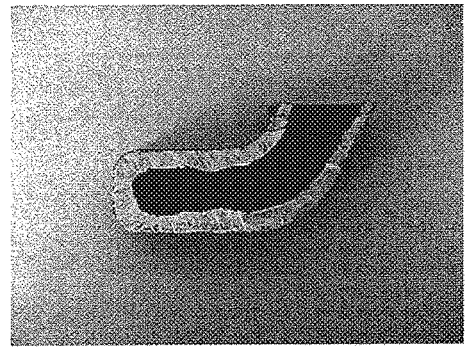
FIG. 7 a section through the fastening lug of the molded part produced according to an embodiment of the invention.

The motorcycle tank is cut open in the area of the fastening lug and the wall thickness is measured. Values between 3.5 mm and 5.9 mm were found. FIG. 7 shows a section through the fastening lug of the molded part produced according to the invention.

COMPARATIVE EXAMPLE (B)

A second motorcycle tank is produced in the conventional manner. The procedure follows the sequence explained for Example (A), but the rotational mold is not provided with an absorbent and/or saturable material in the area of a fastening lug of the future motorcycle tank.

Figure 8:
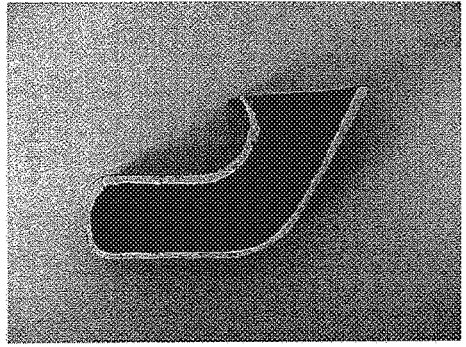
FIG. 8 a section through the fastening lug of a molded part produced according to the state of the art.

After the motorcycle tank has been removed from the mold, it is cut open in the area of the fastening lug and the wall thickness is measured. Values between 0.8 mm and 2.0 mm were found. FIG. 8 shows a section through the fastening lug of the molded part produced according to the state of the art.

Figure 9:
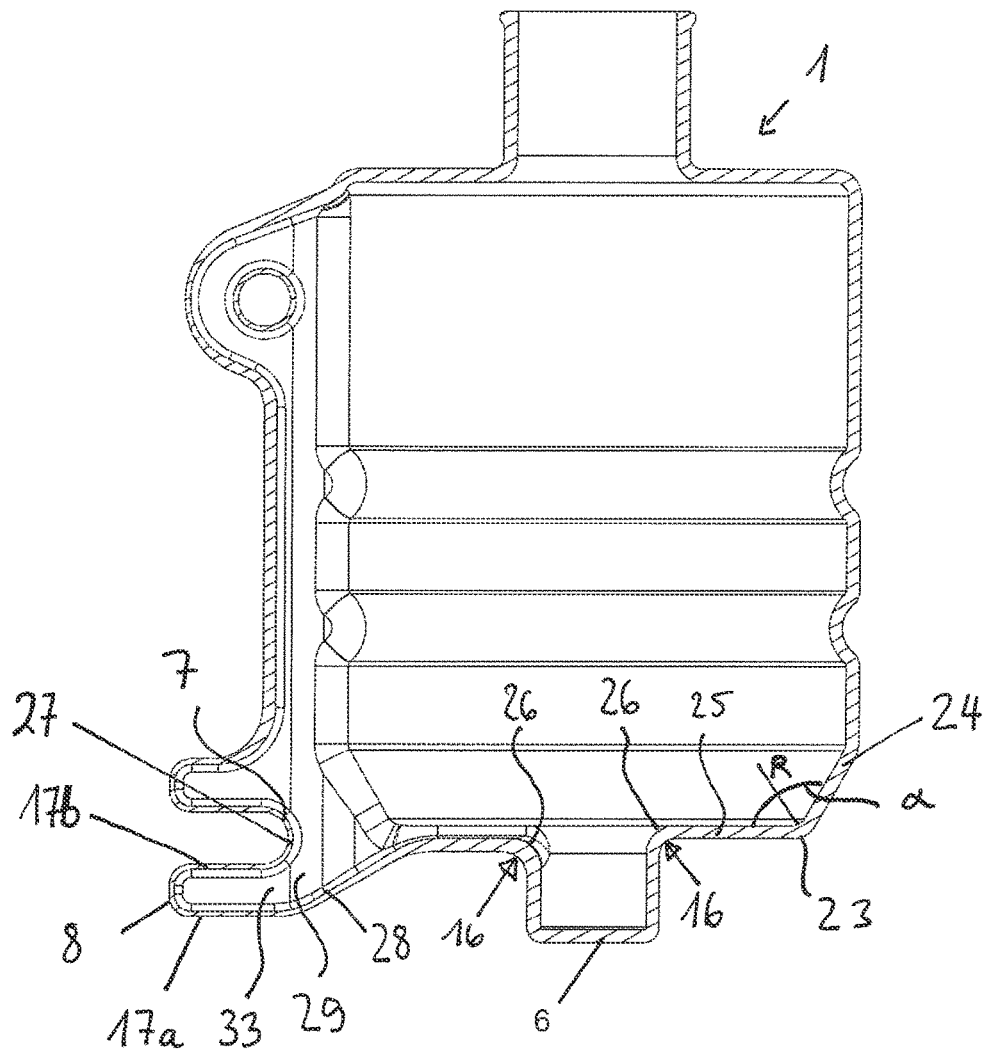
FIG. 9 the plastic container from FIG. 1.

FIG. 9 once again shows the container of FIG. 1. The reference numeral 23 designates an outer edge of the container 1, whereby the adjacent walls 24 and 25 of the container 1 run at an angle α relative to each other. On the inside of the container 1, the edge 23 has a concave contour with an outer radius R. The side walls 24 and 25 run at an obtuse angle α that is greater than 90° relative to each other, so that the transition between the walls 24 and 25 is relatively flat or gradual, and sufficient material can accumulate here during the rotational molding method.

In the transition area 16, the wall of the container 1 has a contour that curves inwards and that has an inner radius 26 that makes a transition to the connector 6. The inner radius 26 surrounds the upper end of the connector 6 as an encircling edge. This critical area, which is characterized especially by a contour of the wall of the container that is convex relative to the interior of the molded part, is effectively strengthened by the use of the insert element (FIG. 3).

In the area of the lug 8, it can be seen that the parallel side wall sections 17a and 17b form a constriction 33, whereby the adjacent side wall sections 27 and 28 first approach each other and then make a transition into the parallel side wall sections 17a and 17b. The side wall section 27 is formed by a free-standing section of the side wall 7 that projects inwards and that ends in a section that is curved inwards (inner radius). In the entry area 29 of the constriction 33, the interior of the container tapers towards the constriction 33. As FIG. 3 clearly shows, in the appertaining area of the mold shell 10 (Area A), there is likewise a tapering of the inner contour that leads into a corresponding constriction 33 (similar to a blind hole). By placing the insert element 18 into the appertaining constriction of the mold (see FIG. 3), when the mold is rotated, a certain amount of plastic precursor is retained in the lug area, as a result of which the wall thickness of the molded part is markedly increased in this lug area (see FIG. 7 versus FIG. 8). Moreover, in the area that forms the side wall section 27 that projects convexly inwards (FIG. 3, Area A), the rotational melt mold can additionally be provided with an insert element in order to ensure that the wall thickness that is formed is also sufficient in the area of this inner radius.

Figure 10:
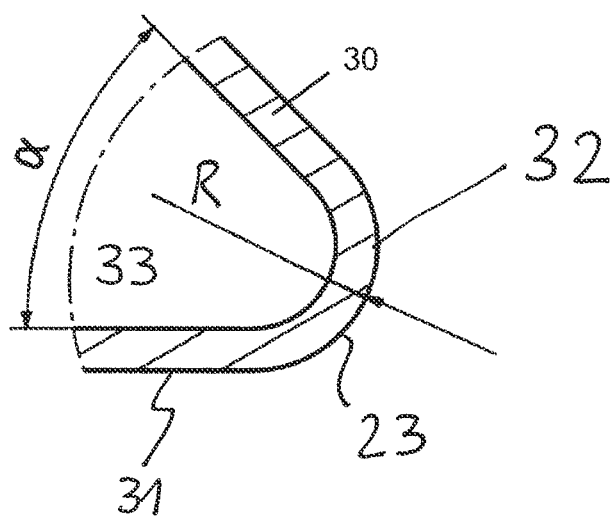
FIG. 10 a sectional view through the edge section of a plastic container according to another embodiment of the invention.

FIG. 10 shows a constriction 33 in a section that is formed in the area of an outer edge 23 of the container. Unlike in FIG. 9, where the side walls 24 and 25 make a transition into each other at an obtuse angle, FIG. 10 shows a situation in which two adjacent side walls 30, 31 run at an acute angle α of approximately 45° relative to each other. In the transition area, the wall of the molded part has an outer radius 32 relative to the interior of the molded part. Here, the contour of the molded part is curved so as to be concave or rather, curved towards the outside, relative to the interior of the molded part. The inner contour of the corresponding rotational melt mold is contoured correspondingly. The more acute the angle α and the smaller the outer radius 32, the greater the risk of void formation and of insufficient shaping in this area. Through the systematic use of an insert element, even in such a critical area, the plastic precursor can be systematically held in the constriction. If α=0, then the situation shown in FIG. 10 changes into a situation according to FIG. 9 (see lug 8 with side wall sections 17a and 17b). Then, there are parallel wall sections in the mold that, if the outer radius 32 is sufficiently small (e.g. $R \leq 3 \cdot d_N$, especially $R \leq 2 \cdot d_N$), are at a small distance from each other and likewise constitute a constriction.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 plastic container
2 interior
3 side walls
4 filling neck
5 bottom area
6 connector/dome
7 side outer wall
8 lug
9 rotational melt mold
10 mold shell
11 mold shell
12 edge/mold flange
13 contour
14 filling opening
15 transition area
16 transition area
17a,b parallel side walls
18 insert element
19 constriction
20 plug
21 ring
22 tube element
23 outer edge
24 wall
25 wall
26 inner radius
27 wall section
28 wall section
29 entry area
30 side wall
31 side wall
32 outer radius
33 constriction
α angle between adjacent side walls
R radius

The invention claimed is:

1. A method for the production of a molded part made of plastic by rotational molding, the method comprising:
   providing an insert element made of at least one of an absorbent and saturable material in a rotational melt mold, the rotational melt mold having at least one of a constriction and a wall that projects, in an area of an inner radius, into an interior of the rotational melt mold, the insert element being arranged in one of the area of the inner radius where the wall of the rotational melt mold projects into the interior of the rotational melt mold, in the constriction of the rotational melt mold, in an area of the wall of the rotational melt mold at which sections of the mold wall have a diminishing distance from each other, on a section curved towards the interior of the rotational melt mold or on an edge of the wall of the rotational melt mold that projects inwards;
   providing a plastic precursor of the plastic intended for the plastic molded part in the rotational melt mold, wherein the plastic precursor is present as a melt in the rotational melt mold; and
   rotating the rotational melt mold so that the melt polymerizes and is simultaneously shaped, so that part of the melt is picked up by the insert element, and so that a wall thickness of the molded part in a finished form is increased in an area where the insert element is arranged.

2. The method according to claim 1, wherein the plastic precursor is provided to the rotational melt mold as a liquid melt.

3. The method according to claim 1, wherein the melt is at least one of a low-viscosity monomer, oligomer and prepolymer melt.

4. The method according to claim 1, wherein the plastic precursor is provided in solid form in the rotational melt mold and melted in the rotational melt mold by application of heat.

5. The method according to claim 1, wherein heat is applied to the rotational melt mold while the rotational melt mold is rotating.

6. The method according to claim 1, wherein the melt polymerizes below a melting temperature of the plastic of the molded part in the finished form.

7. The method according to claim 1, wherein the insert element includes at least one of a textile and a textile composition.

8. The method according to claim 7, wherein the insert element comprises a woven fabric, a non-woven, a knit or a bonded fiber fabric.

9. The method according to claim 1, wherein the insert element comprises at least one of a foam, an open-cell foam and a sponge.

10. The method according to claim 1, wherein the insert element dissolves while the melt polymerizes.

11. The method according to claim 1, wherein the rotating of the rotational melt mold is interrupted in at least one axis of rotation, at least at times.

12. The method according to claim 11, wherein the rotating of the rotational melt mold is interrupted in such a way that the insert element comes to lie at least one of a lowest point of the rotational melt mold and below a level of the melt.

13. The method according to claim 1, further comprising stopping the rotating of the rotational melt mold, providing another plastic precursor or another plastic material in the rotational melt mold, and then rotating the rotational melt mold again.

14. The method according to claim 1, wherein the plastic of the molded part in the finished form is a thermoplastic.

15. The method according to claim 1, wherein the insert element is arranged in the area of the inner radius where the wall of the rotational melt mold projects into the interior of the rotational melt mold or in the constriction of the rotational melt mold.

16. The method according to claim 1, wherein the insert element is arranged in the area of the wall of the rotational melt mold at which sections of the mold wall have the diminishing distance from each other.

17. The method according to claim 1, wherein the insert element is arranged on the section curved towards the interior of the rotational melt mold or on the edge of the wall of the rotational melt mold that projects inwards.

18. A molded part made of plastic and produced by a rotational molding method comprising:
providing an insert element made of at least one of an absorbent and saturable material in a rotational melt mold, the rotational melt mold having at least one of a constriction and a wall that projects, in an area of an inner radius, into an interior of the rotational melt mold, the insert element being arranged in one of the area of the inner radius where the wall of the rotational melt mold projects into the interior of the rotational melt mold, in the constriction of the rotational melt mold, in an area of the wall of the rotational melt mold at which sections of the mold wall have a diminishing distance from each other, on a section curved towards the interior of the rotational melt mold or on an edge of the wall of the rotational melt mold that projects inwards;
providing a plastic precursor of the plastic intended for the plastic molded part in the rotational melt mold, wherein the plastic precursor is present as a melt in the rotational melt mold; and
rotating the rotational melt mold so that the melt polymerizes and is simultaneously shaped, so that part of the melt is picked up by the insert element, and so that a wall thickness of the molded part in a finished form is increased in an area where the insert element is arranged.

19. The molded part according to claim 18, wherein the molded part is at least one of a plastic hollow body, a container and a tank.

* * * * *